Patented July 4, 1950

2,514,186

UNITED STATES PATENT OFFICE 2,514,186

ANTIMONY PHENOL SULFIDES

Harry E. Albert, Akron, Ohio, assignor to The Firestone Tire & Rubber Company, Akron, Ohio, a corporation of Ohio No Drawing. Application October 22, 1945, Serial No. 623,853

10 Claims. (Cl. 260—446)

This invention relates to antimony salts of phenol sulfides. These compounds are useful as stabilizers in rubber-like products formed from butadiene and styrene and have other uses.

The compounds of this invention include the sulfides and polysulfides. They contain two or more phenol residues. These phenol residues may be alkylated. They may be represented by the following formula:

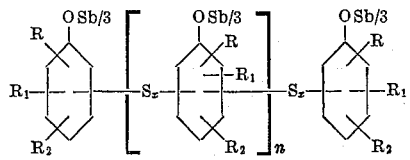

where R, R₁, and R₂ may be hydrogen, halogen or hydrocarbon substituents and may be different or the same in each of the phenol residues; $n$ may be an integer from 0 to 3, inclusive; and $x$ may be an integer from 1 to 4, inclusive, but in the preferred compounds is 1. Any number of the Sb/3 attachments in these compounds from 1 to $(n+1)$ may be replaced by hydrogen.

The compounds of this invention are advantageously prepared by reacting the sodium salt or other alkali or alkaline earth metal salt of the corresponding phenol sulfide with antimony trichloride under anhydrous conditions. The alkali or alkaline earth metal salt of the phenol sulfide may be prepared by reacting the corresponding metal alcoholate with the free phenol sulfide. These general reactions are, of course, limited to the treatment of phenol sulfides which are not so hindered by substituents that they will not form salts as described.

The invention is illustrated by the following examples:

EXAMPLE 1

*Antimony salt of diphenol sulfide*

To 400 cc. of anhydrous methanol, 9.2 grams of metallic sodium were added in small chunks during cooling. Forty-three and six-tenths grams of diphenol monosulfide were dissolved in the resulting solution. A solution of 32 grams of SbCl₃ in 50 cc. of anhydrous methanol was prepared. This solution was added to the sodium salt of diphenol sulfide slowly during stirring. After the reaction mixture had stood one hour at room temperature, it was cooled in an ice bath and the precipitate, which was shown to consist mostly of sodium chloride, filtered. Evaporation of the filtrate gave 55 grams of a grayish-white solid, the trivalent antimony salt of diphenol sulfide, which melted at 235–250° C., uncorrected, to a light yellow liquid.

EXAMPLE 2

*Antimony salt of triphenol bi(monosulfide)*

Four grams of metallic sodium were dissolved in 200 ml. of absolute alcohol during cooling. To this 20 grams of triphenol bi(monosulfide) were added to form the trisodium salt of this compound. A solution of 13.3 grams of antimony trichloride in 100 ml. of absolute alcohol was then added slowly during stirring. A copious white precipitate of the trivalent salt of triphenol bi(monosulfide) was obtained which, on filtering and drying, weighed 25 grams.

EXAMPLE 3

*Antimony salt of di(1-hydroxy-3-methyl-4-tert.-butyl-phenyl) monosulfide*

Four and six-tenths grams of metallic sodium were dissolved in 200 cc. of anhydrous methanol during cooling and 35.8 grams of crude di(1-hydroxy-3-methyl-4-tert.-butyl-phenyl) monosulfide added to the resulting solution. To this was added a solution of 15.2 grams of antimony trichloride in 5 cc. of methanol during stirring. A light orange precipitate was obtained which was filtered off and dried. It weighed 24.6 grams. It darkened and decomposed on heating to a high temperature. The filtrate was evaporated on a steam plate, and the residue leached with water. It was a medium brown semisolid and weighed 26.5 grams. The combined precipitate and semisolid residue, 51.1 grams, represented the crude yield of the trivalent antimony salt of di(1-hydroxy-3-methyl-4-tert.-butyl-phenyl) monosulfide.

The following compounds may be similarly prepared:

Trivalent antimony salt of diphenol bisulfide
Trivalent antimony salt of diphenol polysulfide
Trivalent antimony salt of triphenol bi(disulfide)
Trivalent antimony salt of di(para-tertiary-amyl-phenol) monosulfide
Trivalent antimony salt of di(para-tertiary-butyl-phenol) disulfide
Trivalent antimony salt of di(ortho-cresol) monosulfide
Trivalent antimony salt of di(meta-cresol) monosulfide
Trivalent antimony salt of di(beta-naphthol) monosulfide
Trivalent antimony salt of di(para-phenylphenol) monosulfide Trivalent antimony salt of di(4-benzylphenol) monosulfide Trivalent antimony salt of di(para-chlorphenol) monosulfide The above list is illustrative of the compounds which may be prepared, but the invention is not limited thereto. It is possible that the compounds may be prepared by other reactions than that described. Accordingly, the appended claims are not limited to the compounds or methods disclosed herein.

What I claim is:

1. Trivalent antimony salts of halogen-substituted phenol sulfides.
2. Trivalent antimony salt of diphenol sulfide.
3. Trivalent antimony salt of triphenol bi(monosulfide).
4. Trivalent antimony salt of di(1-hydroxy-3-methyl-4-tertiary-butyl-phenyl) monosulfide.
5. Trivalent antimony salts of unsubstituted phenol sulfides.
6. Trivalent antimony salts of phenol sulfides of the class which consists of unsubstituted phenol sulfides, halogen substituted phenol sulfides, and phenol sulfides substituted with carbon-chain substituents which include no more than seven carbon atoms.
7. Trivalent antimony salts of diphenol sulfides substituted only with alkyl groups containing no more than five carbon atoms.
8. Trivalent antimony salts of phenol sulfides substituted only with hydrocarbon substituents containing no more than six carbon atoms.
9. Trivalent antimony salts of chlorphenol sulfides.
10. Trivalent antimony salt of di(para-chlorphenol) monosulfide.

HARRY E. ALBERT.

REFERENCES CITED

The following references are of record in the file of this patent:

UNITED STATES PATENTS

| Number | Name | Date |
|---|---|---|
| 2,380,299 | Evans et al. | July 10, 1935 |
| 2,281,401 | Wilson | Apr. 28, 1942 |
| 2,310,449 | Lightbown et al. | Feb. 9, 1943 |
| 2,340,938 | Daly | Feb. 8, 1944 |
| 2,346,808 | Winning et al. | Apr. 18, 1944 |
| 2,362,289 | Mikeska | Nov. 7, 1944 |
| 2,364,338 | Beaver | Dec. 5, 1944 |
| 2,366,873 | Reiff | Jan. 9, 1945 |
| 2,366,874 | Reiff | Jan. 9, 1945 |
| 2,368,880 | Reiff | Feb. 6, 1945 |

FOREIGN PATENTS

| Number | Country | Date |
|---|---|---|
| 567,754 | Germany | Jan. 9, 1933 |